United States Patent Office 2,775,597
Patented Dec. 25, 1956

2,775,597

METHOD FOR PREPARING QUINAZOLONE INTERMEDIATES

Bernard R. Baker, Nanuet, N. Y., and Francis J. McEvoy, Nutley, N. J., assignors to American Cyanamid Company, New York, N. Y., a corporation of Maine No Drawing. Application February 12, 1954,
Serial No. 410,034

13 Claims. (Cl. 260—294.3)

This invention relates to new organic compounds and methods for preparing the same. More particularly it relates to an improved synthesis for 1-carbethoxy-2-(gamma-bromoacetonyl) - 3 - methoxy-piperidine. New intermediates involved in the synthesis and novel methods for their preparation are also included in the scope of the invention.

The compound 1-carbethoxy-2-(gamma-bromoacetonyl-3-methoxy-piperidine) is a useful intermediate in the synthesis of beta-keto-alkyl-quinazolones which are valuable in the field of dye intermediates and pharmaceuticals. For example, it may be readily converted to the therapeutically valuable 3-[beta-keto-gamma-(1-carbethoxy-3-methoxy-2-piperidyl)propyl]-4-quinazolone upon treatment with sodium methoxide in methyl alcohol as disclosed in Patent No. 2,651,632.

Previously known methods of synthesizing 1-carbethoxy-2-(gamma-bromoacetonyl) - 3 - methoxy - piperidine involved the use of diazomethane which is toxic, explosive and limited in availability. In view of the importance of this compound as an intermediate for the preparation of valuable therapeutic and pharmaceutical substances, a simple, inexpensive and safe method for its synthesis, is highly desirable. These objects are attained by the process of the present invention in which the use of diazomethane is avoided.

In accordance with the process of this invention, 1-carbethoxy - 2 - (gamma - bromoacetonyl) - 3 - methoxy-piperidine is obtained by a method involving a number of new organic compounds and reactions. The starting material, 2-methyl-3-pyridol, is converted to 2-methyl-3-methoxypyridine upon treatment with suitable alkali, for example an alkali metal alcoholate such as sodium methoxide, sodium ethoxide, potassium methoxide or lithium ethoxide; alkali metal hydroxides such as sodium hydroxide, potassium hydroxide or lithium hydroxide; alkali metal carbonates, such as sodium carbonate, potassium carbonate, or lithium carbonate, in the presence of trimethylphenylammonium chloride followed by refluxing in a suitable organic solvent. The reaction may be represented as follows:

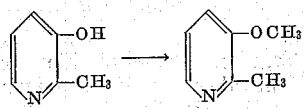

The temperature during this reaction is critical and should be maintained within the range of 120° C. and 180° C. Although the reaction proceeds smoothly with or without a solvent, if one is used it must be of an organic, non-acidic character, such as for example, acetone, dimethylformamide, chloroform, ethyl acetate, toluene, xylene, chlorobenzene, formamide, ethylene glycol or others of similar nature.

The 2-methyl-3-methoxy-pyridine is then treated with an aryl or lower alkyl lithium salt such as phenyl-lithium or butyl-lithium, in the presence of an inert organic solvent such as that used in the Grignard synthesis . . . for example, ethyl ether or butyl ether. The intermediate 2-lithium methyl-3-methoxy-pyridine is then treated with acetaldehyde to give the compound 2-(beta-hydroxy-propyl)-3-methoxy-pyridine:

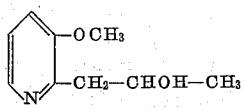

This compound is then reduced to the piperidine:

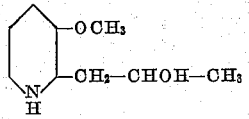

by catalytic reduction in the presence of platinum oxide in an acid solution. The presence of the acid aids in the reduction of the pyridine ring and increases the speed of hydrogenation. Acids which are useful for this purpose are acetic, sulfuric, phosphoric, and others of similar nature.

The alcohol comprising the side chain of the piperidine nucleus can next be oxidized to the corresponding ketone—namely, 2-acetonyl-3-methoxy-piperidine, upon treatment with an oxidizing agent such as chromium trioxide or potassium permanganate in the presence of an organic or inorganic acid—such as for example, acetic, propionic, phosphoric or sulfuric.

If so desired, the transformation of the propyl pyridine to the acetonyl piperidine may be accomplished directly without isolation of the hydroxy propyl piperidine. This is done by catalytic reduction of 2-(β-hydroxy-propyl)-3-methoxy-pyridine in the presence of an acid such as acetic, propionic, phosphoric or sulfuric. This results in the formation of the corresponding piperidine salt which is then subjected without isolation to liquid-phase oxidation with chromic acid mixture—namely, potassium dichromate in sulfuric acid, to give 2-acetonyl-3-methoxy-piperidine. The reaction may be represented as follows:

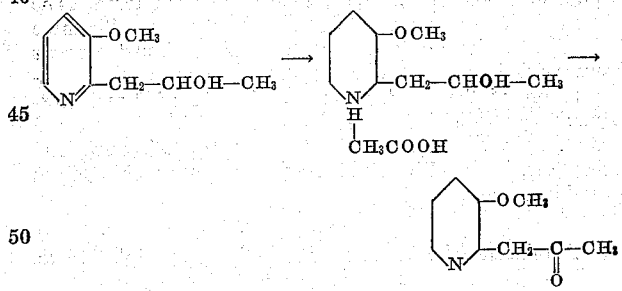

The methyl group on the acetonyl side chain is brominated by the addition of bromine to a solution of 2-acetonyl-3-methoxy-piperidine in water, aqueous acetic acid or glacial acetic acid containing hydrogen bromide. The resultant compound 2-(gamma-bromo-acetonyl)-3-methoxy-piperidine hydrobromide:

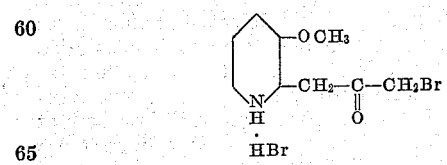

is then readied for condensation with the quinazolone nucleus by protecting the piperidine nitrogen with a suitable blocking group such as the carbethoxy, carbobenzoxy, carboallyloxy, or benzoyl in the presence of a weak base, as for example, an alkali metal carbonate or bicarbonate, such as sodium bicarbonate, sodium carbonate, potassium bicarbonate, potassium carbonate, and others. Convenient reagents for attaching such groups to the nitrogen are ethyl chloroformate, allyl chloroformate, benzyl chloroformate, or benzoyl chloride. The preferred reagent for the reaction in this invention is ethyl chloroformate, which protects the nitrogen with the carbethoxy group. Condensation of the so-obtained 1-carbethoxy-2-(gamma-bromoacetonyl-3-methoxy-piperidine):

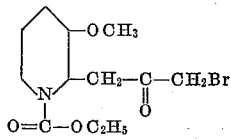

with the quinazolone nucleus and subsequent hydrolytic removal of the carbethoxy function may be accomplished by any of the well known methods, such as for example, treatment with aqueous hydrochloric acid.

The following examples will serve to illustrate the novel step involved in this synthesis and the new compounds resulting therefrom. All parts are by weight unless otherwise indicated.

Example I

To a solution of 3.8 gms. of 2-methyl-3-pyridol (J. Am. Chem. Soc., 71, 2971) and 1.9 gms. or sodium methoxide in 19 ml. of methanol was added a solution of 6.7 gms. of trimethylphenylammonium chloride in 10 ml. of methanol. After 30 minutes the solution was filtered and evaporated to dryness in vacuo. The residue was dissolved in 50 ml. of dimethylformamide and refluxed for 1 hour. After addition of 38 ml. of saturated absolute alcoholic hydrogen chloride, the solution was evaporated to dryness in vacuo. A solution of the residue in 40 ml. of water was made basic with 40 ml. of 10% sodium hydroxide, then extracted twice with chloroform. The combined extracts were evaporated in vacuo leaving 6.2 gms. of an oil. This oil was dissolved in 30 ml. of ether and shaken with a solution of 20 gms. of cadmium chloride in 40 cc. of water. The white precipitate of the cadmium chloride complex of 2-methyl-3-methoxy-pyridine was collected on a filter and washed with water, then ether. The precipitate was suspended in 60 ml. of water and 40 ml. of 10% sodium hydroxide. After being heated on a steam-bath for 1 hour, the mixture was filtered. The filtrate was saturated with salt and extracted with three 25 ml. portions of chloroform. The combined extracts were dried with magnesium sulfate and evaporated. Distillation of the residue gave 1.25 gms. of 2-methyl-3-methoxypyridine as a colorless oil, B. P. 80–82° C. (13 mm.). This compound is somewhat soluble in water and heptane, but readily soluble in alcohol, ether, chloroform and benzene.

Example II

A mixture of 72.6 gms. of 2-methyl-3-pyridol, 726 cc. of dimethylformamide, 40 gms. of sodium methoxide and 128 gms. of trimethylphenylammonium chloride was refluxed for 2½ hours. The reaction mixture was processed as in Example 1 to give 60.8 gms. of 2-methyl-3-methoxy-pyridine, B. P. 84–86° C. (15 mm.).

Example III

To a solution of 5.0 gms. of sodium methoxide and 10 gms. of 2-methyl-3-pyridol in 50 cc. of methanol was added 17.6 gms. of trimethylphenylammonium chloride in 26 cc. of methanol. After 15 minutes the mixture was filtered and the filtrate evaporated to dryness under reduced pressure. The residue was pyrolyzed in a bath at 120–140° C. at a pressure of 17 mm. until no more product distilled. The distillate, a mixture of dimethylaniline and 2-methyl-3-methoxy-pyridine, was treated in ether with aqueous cadmium chloride as in Example I to give 5.5 gms. of 2-methyl-3-methoxy-pyridine, B. P. 82° C. (15 mm.).

Example IV

To a solution of 5.0 gms. of sodium methoxide and 10 gms. of 2-methyl-3-pyridol in 50 cc. of methanol was added a solution of 17.6 gms. of trimethylphenylammonium chloride in 26 cc. of methanol. After 15 minutes the mixture was filtered and the filtrate evaporated to dryness under reduced pressure. The residue was dissolved in 30 cc. of phenoxy ethanol and slowly distilled at 17 ml. The distillate (16.1 gm.) B. P. 88–89° C. (17 mm.) was a mixture of dimethylaniline and 2-methyl-3-methoxy-pyridine which was separated with cadmium chloride as in Example I.

Example V

A mixture of 13.1 gms. of 2-methyl-3-pyridol, 7.2 gms. of sodium methoxide, 131 ml. of dimethylformamide and 23 gms. of trimethylphenylammonium chloride was refluxed for 2 hours. After filtration from salt the solution was acidified with 130 ml. of saturated absolute alcoholic hydrogen chloride, then evaporated to dryness in vacuo. The residue was dissolved in 75 ml. of water basified with 150 ml. of 10% sodium hydroxide and extracted with two 100 ml. portions of ether. The combined extracts were shaken with 75 ml. of 1.75 M cadmium chloride solution. The pasty mass was treated with 100 ml. of water and 13 gms. of Celite, then filtered. The cadmium chloride complex was mashed with two 50 ml. portions of water and two 50 ml. portions of ether. The moist cake was stirred and heated on the steam-bath under a condenser with 300 ml. of 5% sodium hydroxide for 1 hour. The cooled mixture was diluted with 75 ml. of chloroform and filtered. The filter cake was washed with two 75 ml. portions of chloroform, each washing being used separately to extract the aqueous layer. The combined extracts, dried with magnesium sulfate, were distilled on a steam-bath through a Vigreaux column to remove solvent. Distillation of the residue gave 11.1 gms. of 2-methyl-3-methoxy-pyridine as a colorless oil, B. P. 80–82° C. (14 mm.).

Example VI

To a solution of phenyl lithium from 2.8 gms. of lithium and 21 ml. of bromobenzene in 160 ml. of dry ether was added 12.4 gms. of 2-methyl-3-methoxy-pyridine dropwise over a period of 15 minutes. The red-brown mixture was refluxed and stirred for 1 hour. Cooled to 5° C. in an ice-salt bath, the mixture was treated by the drop-wise addition of 11.3 ml. of freshly distilled acetaldehyde in 15 ml. of dry ether over a period of 25 minutes. With continued cooling 40 ml. of water was added drop-wise followed by 40 ml. of concentrated hydrochloric acid. The separated aqueous layer was cautiously added to a mixture of 44 gms. of sodium carbonate and 60 ml. of water. After addition of 120 cc. of chloroform, the mixture was filtered. The precipitate was washed with three 80 ml. portions of chloroform which were used separately to extract the aqueous layer in the filtrate. The combined chloroform extracts, dried with magnesium sulfate, were evaporated to dryness in vacuo. Distillation of the residue gave 7.7 gms. of 2-(β-hydroxypropyl)-3-methoxypyridine as straw colored oil, B. P. 130–148° C. (10 mm.). Redistillation gave the pure product, B. P. 143–146° C. (10 mm.). This compound is soluble in water, alcohol, ether or chloroform, but insoluble in petroleum ether. It forms a hydrochloride salt from ether as white crystals, M. P. 153–154° C.

Example VII

To a refluxed and stirred solution of phenyl lithium from 113 ml. of bromobenzene in 870 cc. of dry ether was added 66.7 gms. of 2 - methyl - 3 - methoxy-pyridine over a period of forty-five minutes. After being refluxed an additional hour, the mixture was cooled in a nitrogen atmosphere to 5° C. and treated with a solution of 61 ml. of freshly distilled acetaldehyde in 78 cc. of dry ether at such a rate that the temperature was 5–7° C. (40 minutes). The reaction mixture was processed as in Example VI to give 60 gms. of 2-(β-hydroxypropyl)-3-methoxy-pyridine as a yellow oil, B. P. 105–125° C. (0.1 mm.).

*Example VIII*

A solution of 4.3 gms. of 2-(β-hydroxypropyl)-3-methoxy-pyridine in 25 ml. of acetic acid was shaken with hydrogen at 2–3 atmospheres and 70° C. in the presence of 0.3 gms. of platinum oxide until reduction was complete (about 3 hours). The filtered solution was evaporated to dryness in vacuo. The residue was dissolved in 15 ml. of water, basified with about 10 ml. of 50% potassium hydroxide and extracted with four 25 ml. portions of ether. The combined extracts were dried with magnesium sulfate. The solvent was evaporated in vacuo (bath 45° C.). Distillation of the residue gave 3.3 gms. of 2-(β-hydroxypropyl)-3-methoxy-piperidine as a colorless oil, B. P. 126–130° C. (15 mm.), which solidified on standing. This compound is soluble in water, alcohol, ether and chloroform, but almost insoluble in petroleum ether.

*Example IX*

To a solution of 3.1 gms. of 2-(β-hydroxypropyl)-3-methoxy-piperidine in 18 ml. of acetic acid at 80° C. was added a solution of 1.35 gms. of chromium trioxide in 1.35 ml. of water portion-wise over a period of 10 minutes. The solution was heated on a steam-bath for an additional 30 minutes, then evaporated to dryness in vacuo. The residue was dissolved in 15 ml. of water, basified with 10 ml. of 50% potassium hydroxide, then extracted twice with ether. The combined extracts were dried with magnesium sulfate and evaporated in vacuo (bath 45° C.). Distillation of the residue gave 1.83 gms. of 2-acetonyl-3-methoxy-piperidine as a nearly colorless oil, B. P. 110–118° C. (15 mm.). This compound is soluble in water, alcohol, ether, chloroform or acetic acid, but insoluble in petroleum ether.

*Example X*

A solution of 24 gms. of 2-(β-hydroxypropyl)-3-methoxy-piperidine in 100 ml. of acetic acid was shaken with hydrogen at 2–3 atmospheres and 78° C. until reduction was complete (3 hours). The filtered solutions from two such reductions were combined and evaporated in vacuo to a viscous syrup of 2-(β-hydroxypropyl)-3-methoxy-piperidine acetate. To a solution of this syrup in 325 ml. of water was added 46 ml. of 96% sulfuric acid drop-wise with cooling. Then 41.7 gms. of potassium dichromate was added. The temperature was maintained at 30–35° C. by occasional cooling until the reaction was no longer exothermic (30 minutes). After standing for 20 hours at room temperature, the solution was filtered from the chromic sulfate crystals. The filtrate was diluted with 270 ml. of water, then basified with 390 ml. of 50% potassium hydroxide. The solution was clarified by filtration through Celite and extracted with five 270 ml. portions of ether. The combined extracts, dried with magnesium sulfate, were concentrated in vacuo. Fractional distillation of the residue gave 21.4 gms. 2-acetonyl-3-methoxy-piperidine as a colorless oil, B. P. 68–76° C. (1.1 mm.).

*Example XI*

To a solution of 500 mg. of 2-acetonyl-3-methoxy-piperidine in 4.0 ml. of 15% hydrogen bromide in acetic acid was added drop-wise a solution of 0.15 cc. of bromine in 0.5 cc. acetic acid. After 2 hours at room temperature, the solution was evaporated to dryness in vacuo. The residual 2-(γ-bromoacetonyl)-3-methoxypiperidine hydrobromide was dissolved in 10 cc. of chloroform and stirred in an ice-bath. After the addition of 10 ml. of saturated aqueous sodium bicarbonate and 0.32 cc. of ethyl chlorocarbonate, the mixture was stirred at 0° C. for 30 minutes. After the addition of 3 ml. of saturated aqueous sodium bicarbonate and 0.32 ml. of ethyl chlorocarbonate, the mixture was stirred at 0° C. for an additional 30 minutes. The separated chloroform layer was washed with two 10 ml. portions of 1N hydrochloric acid. Dried with magnesium sulfate, the solution was evaporated to dryness in vacuo leaving 910 mg. of 1-carbethoxy-2-(γ-bromoacetonyl)-3-methoxy-piperidine as a gum.

*Example XII*

910 mg. of 1-carbethoxy-2-(γ-bromoacetonyl)-3-methoxy-piperidine was condensed with 410 mg. of 4-quinazolone as described in U. S. Patent No. 2,651,632. A yield of 380 mg. of 3-[β-keto-γ-(1-carbethoxy-3-methoxy-2-piperidyl)-propyl]-4-quinazolone was obtained, M. P. 135–136° C.

We claim:

1. A method which comprises the steps of treating 2-methyl-3-pyridol with sodium methoxide and trimethylphenylammonium chloride at a temperature of from about 120° C. to about 180° C. in the presence of a non-acidic organic solvent to obtain:

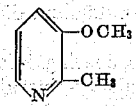

contacting said compound with phenyl lithium in the presence of a member selected from the group consisting of ethyl ether and butyl ether, then contacting the intermediate 2-lithium methyl-3-methoxy-pyridine with acetaldehyde to obtain:

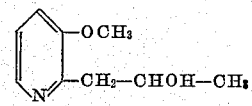

reducing said compound with hydrogen in the presence of platinum oxide catalyst to obtain:

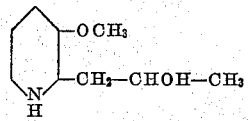

oxidizing said compound under strong oxidizing conditions to obtain:

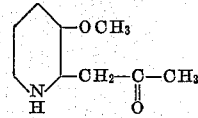

brominating said compound to obtain:

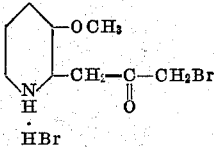

and contacting said product with ethyl chlorocarbonate to obtain:

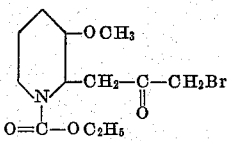

2. In a method for preparing 1-carbethoxy-2-(gamma-bromoacetonyl)-3-methoxy-piperidine, which comprises the step of contacting 2-methyl-3-pyridol with sodium methoxide and trimethylphenylammonium chloride in the presence of a non-acidic organic solvent.

3. In a method for preparing 1-carbethoxy-2-(gamma-bromoacetonyl)-3-methoxy-piperidine, which comprises the step of reacting 2-methyl-3-methoxy-pyridine with phenyl lithium in the presence of a member selected from the group consisting of ethyl ether and butyl ether.

4. In a method for preparing 1-carbethoxy-2-(gamma-bromoacetonyl)-3-methoxy-piperdine, which comprises the step of reacting 2 - lithium methyl - 3 - methoxy-pyridine with acetaldehyde.

5. In a method for preparing 1-carbethoxy-2-(gamma-bromoacetonyl)-3-methoxy-piperidine, which comprises the step of reducing 2-(beta-hydroxy-propyl)-3-methoxy-pyridine with hydrogen and platinum oxide catalyst in the presence of a strong acid.

6. In a method for preparing 1-carbethoxy-2-(gamma-bromoacetonyl) - 3 - methoxy-piperidine, which comprises the step of oxidizing 2-(beta-hydroxy-propyl)-3-methoxy-pyridine which comprises treating said compound with chromium trioxide in the presence of a weak acid.

7. In a method for preparing 1-carbethoxy-2-(gamma-bromoacetonyl) - 3 - methoxy-piperidine, which comprises the steps of treating 2 - (beta-hydroxy-propyl)-3-methoxy-pyridine with hydrogen and oxidizing the resultant compound with potassium dichromate in the presence of a strong acid.

8. In a method for preparing 1-carbethoxy-2-(gamma-bromoacetonyl) - 3-methoxy-piperidine, which comprises the step of treating 2-acetonyl-3-methoxy-piperidine with hydrogen bromide in the presence of a member selected from the group consisting of water, glacial acetic acid and mixtures of water and acetic acid, followed by the drop-wise addition of bromine.

9. In a method for preparing 1-carbethoxy-2-(gamma-bromoacetonyl)-3-methoxy-piperidine, which comprises the step of treating 2 - (gamma-bromoacetonyl) - 3 - methoxy-piperidine hydrobromide with ethyl chlorocarbonate under weakly basic conditions.

10. The compound 2 - (beta-hydroxy-propyl) - 3 - methoxy-pyridine.

11. The compound 2 - (beta-hydroxy-propyl) - 3 - methoxy-piperidine.

12. The compound 2-acetonyl-3-methoxy-piperidine.

13. The compound 2 - (gamma-bromoacetonyl) - 3 - methoxy-piperidine hydrobromide.

References Cited in the file of this patent

FOREIGN PATENTS 125,690     Austria _____ Nov. 25, 1931

OTHER REFERENCES

Marion et al.: Jour. Am. Chem. Soc., vol. 71, pp. 3402–04 (1949).